US007743663B2

(12) United States Patent
Von Berg et al.

(10) Patent No.: US 7,743,663 B2
(45) Date of Patent: Jun. 29, 2010

(54) SENSOR UNIT

(75) Inventors: Jochen Von Berg, Winterthur (CH);
Christof Sonderegger, Neftenbach (CH); Claudio Cavalloni, Regensdorf (CH); René Tanner, Seuzach (CH); Marco Gnielka, Winterthur (CH)

(73) Assignee: Kistler Holding, AG, Winterthur (CH)

( * ) Notice: Subject to any disclaimer, the term of this patent is extended or adjusted under 35 U.S.C. 154(b) by 300 days.

(21) Appl. No.: 11/994,786

(22) PCT Filed: Jul. 4, 2006

(86) PCT No.: PCT/CH2006/000354

§ 371 (c)(1),
(2), (4) Date: Jan. 4, 2008

(87) PCT Pub. No.: WO2007/009277

PCT Pub. Date: Jan. 25, 2007

(65) Prior Publication Data
US 2008/0264173 A1    Oct. 30, 2008

(30) Foreign Application Priority Data
Jul. 20, 2005    (CH) ..................... 1212/05

(51) Int. Cl.
*G01L 9/06*    (2006.01)
(52) U.S. Cl. ...................................... 73/727
(58) Field of Classification Search .............. None
See application file for complete search history.

(56) References Cited
U.S. PATENT DOCUMENTS
4,576,049 A * 3/1986 Kohnlechner ............... 73/706

4,984,468 A * 1/1991 Hafner ....................... 73/727

(Continued)

FOREIGN PATENT DOCUMENTS
EP    0251592    1/1988

OTHER PUBLICATIONS
PCT/CH2006/000354—International Search Report Publication Date: Oct. 25, 2006.

*Primary Examiner*—Lisa M Caputo
*Assistant Examiner*—Jermaine Jenkins
(74) *Attorney, Agent, or Firm*—Dority & Manning, P.A.

(57) ABSTRACT

The invention relates to a sensor unit for measuring a measurable variable, especially in an aggressive medium. Said sensor unit comprises a sensor which is disposed in a sensor casing and is provided with a sensor zone located on a base. In order to detect the measurable variable in the sensor zone, a measuring hole which allows the medium to advance directly to the sensor zone is provided in the sensor casing. A side of the sensor zone that faces away from the measuring hole is equipped with a measuring surface which encompasses measuring electronics. An electrical feeder is provided on the sensor in order to transmit a sensor signal generated by the measuring electronics. The sensor is sealingly arranged on a sealing surface located on the sensor casing in such a way that the measuring surface is isolated from the medium. A mechanism is provided by means of a which the sensor can be disconnected from thermally and/or mechanically induced changes in the sensor casing. There also is a probe comprising a sensor unit, as well as an internal combustion engine, a hydraulic or pneumatic tool, and an air conditioner encompassing a sensor unit.

20 Claims, 6 Drawing Sheets

Figure 1:
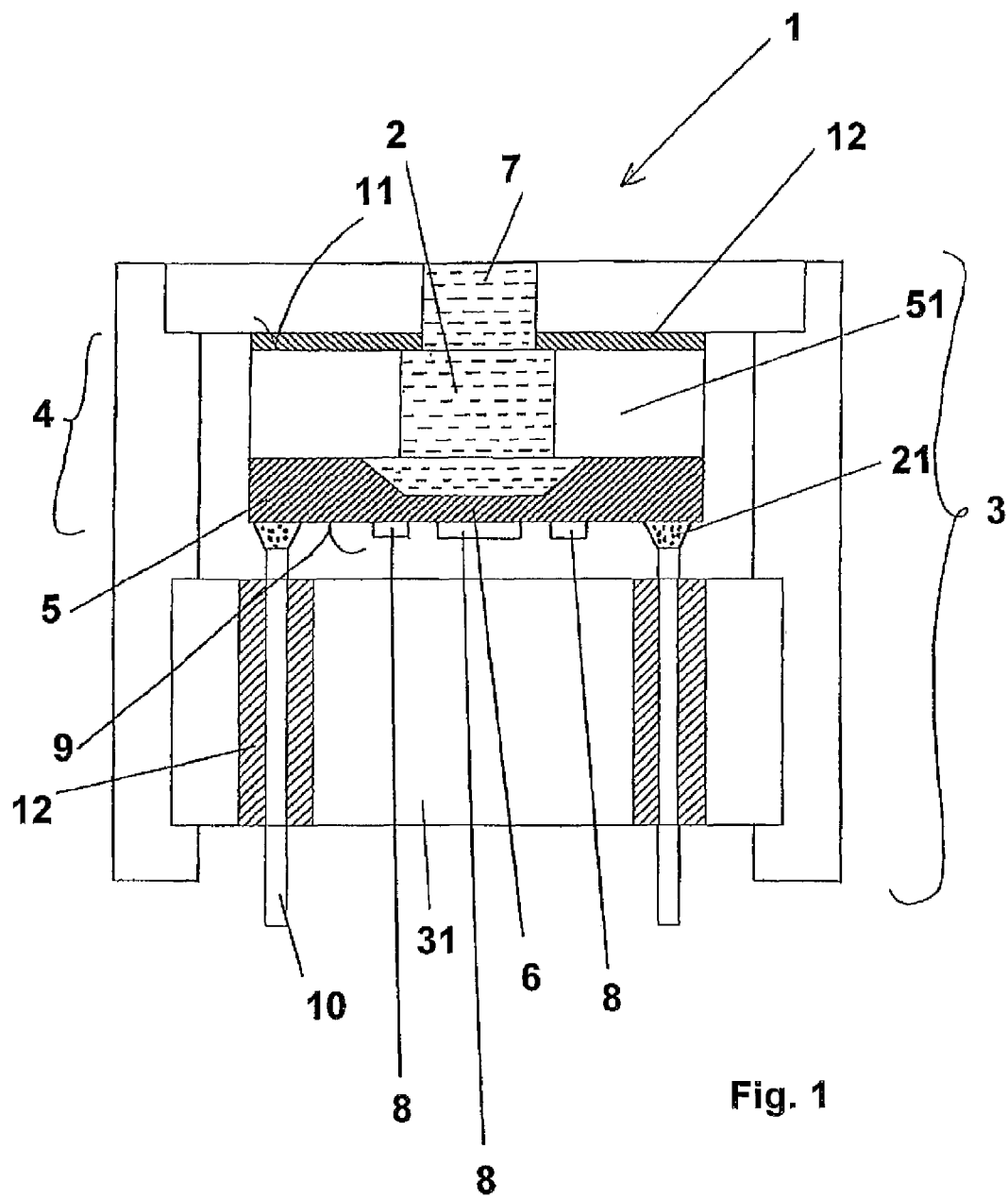

U.S. PATENT DOCUMENTS 5,400,655 A * 3/1995 Tamai et al. .................. 73/706
5,509,312 A    4/1996 Donzier 2002/0033050 A1   3/2002 Shibata
2009/0071259 A1 * 3/2009 Tanaka et al. .................. 73/725

* cited by examiner

SENSOR UNIT

TECHNICAL FIELD

The invention relates to a sensor unit for measuring a measurable variable, especially in an aggressive medium, a probe comprising a sensor unit according to the invention as well as to an internal combustion engine, a hydraulic or pneumatic tool and an air conditioner encompassing an inventive sensor unit or probe.

PRIOR ART

A plurality of different sensors for measuring various measurable variables is known in the prior art. In this respect, sensors gain more and more importance which detect temperature and pressure data of machines or tools, for example, to monitor particular operation conditions or to control or to regulate these devices. Fundamentally problematic in this respect is the detection of relevant measurable variables with high precision in aggressive media, in particular if the sensor is subjected not only to the medium to be measured but also to external influences not involved in the actual measurement. A typical example is a piezosensor intended for measuring the pressure and/or the temperature in an aggressive medium, e.g. a motor oil in the operating state of the internal combustion engine. Therefore, sensors designed for such applications are usually equipped with a membrane which transmits the variable to be measured via a liquid or rigid coupling medium onto the actual measuring element which it protects from the aggressive medium, such as described for example in EP 0251592. In this case, however, the problem frequently arises that the sensor is influenced by the installation as such, i.e. by the contact to the machine since a coupling between the sensor and the machine is established by the installation as such whereby for example thermally or mechanically induced tensions are transmitted to the sensor which in the sensor due to its piezoelectric and/or piezoresistive and/or other measurement principles simulate measurement signals which do not at all originate from the medium to be measured and thereby adulterate the actual measurement signal in a completely unacceptable manner.

DESCRIPTION OF THE INVENTION

Therefore, it is the object of the invention to provide an improved sensor unit which is reliably useful also in the presence of an aggressive medium and which is insensitive to interfering mechanical and thermal environmental influences so that in particular the measurement accuracy and/or the measurement sensitivity as well as the signal-to-noise ratio are substantially increased as compared to sensor units known from the prior art.

The subject matters of the invention which achieve said object are characterized by the features of the independent claim 1.

The dependent claims relate to particularly advantageous exemplary embodiments of the invention.

Thus, the invention relates to a sensor unit for measuring a measurable variable, especially in an aggressive medium, comprising a sensor which is disposed in a sensor casing and provided with a sensor zone located on a base. In order to detect the measurable variable in the sensor zone, a measuring hole which allows the medium to advance directly to the sensor zone is provided in the sensor casing. A side of the sensor zone that faces away from the measuring hole has a measuring surface equipped with measuring electronics wherein an electrical feeder is provided on the sensor to transmit a sensor signal generated by the measuring electronics.

The sensor is sealingly arranged on a sealing surface located on the sensor casing so that the measuring surface is isolated from the medium. According to the invention, a disconnecting means is provided by means of which the sensor can be disconnected from thermally and/or mechanically induced changes in the sensor casing.

Because a disconnecting means is provided according to the invention by which the sensor can be disconnected from thermally and/or mechanically induced changes of the sensor casing the sensor essentially detects only the properties of the medium which acts directly on the sensor zone of the sensor as a measurable variable. This means that interfering influences due to the inevitable coupling of the sensor to its environment, e.g. to a housing of the sensor with which known sensor units are connected, can be practically completely suppressed by the present invention. The disconnecting means can for example comprise elastic media so that changes of the sensor housing, such as for example tensions or changes in length due to thermal or mechanical influences, thermal expansions due to temperature variations or mechanical strains induced for example by the installation of the sensor into a device, are not transferred to the sensor itself so that the measuring electronics are not subjected to the interfering environmental influences and the measurement accuracy and measurement sensitivity of the sensor are markedly improved compared to the state of the art. This is of particular advantage if the measuring electronics comprises e.g. piezoelectric and/or piezoresistive sensors for the measurement of pressure, force or acceleration. If the sensor is for example a piezoelectric- or piezoresistance-based pressure or temperature sensor for measuring a pressure or a temperature in a medium, mechanical tensions transferred to the sensor, e.g. by a housing of the sensor or by the sensor casing, respectively, can lead to a deterioration of the measurement signal and the sensor generating a sensor signal which does not correspond to the actual pressure or temperature, respectively, of the medium.

It should be understood that simultaneously or alternatively the disconnecting means can be constructed in a way that the sensor can also be disconnected from direct thermal influences by the sensor casing. This is an advantage especially if the measuring electronics comprises a temperature sensor for measuring a temperature of the medium. In this case it is of particular importance that no transfer of heat or temperature, respectively, happens between sensor and sensor casing so that the sensor actually detects the correct temperature and not a temperature which is falsified by thermal influences of the sensor casing.

In this respect, the disconnecting means can also be prepared in a way that e.g. the sensor casing is made from a mechanically and/or thermally matched material, in particular from a metal or metal alloy, so that e.g. the sensor casing and the components of the sensor thermally and/or mechanically coupled thereto have approximately equal thermal expansion coefficients so that e.g. in the case of temperature variations no mechanical strains can arise.

Since the sensor is intended particularly, but not exclusively, for use in aggressive media such as for example for measuring the pressure and/or temperature in a more or less aggressive liquid such as motor oil, brake fluid, cooling fluid etc. the measuring electronics is arranged on the sensor zone of the sensor in a way that the measuring electronics is not directly subjected to the aggressive medium. This is achieved by arranging the measuring electronics on a measuring surface at a side of the sensor casing that faces away from the measuring hole wherein the sensor is sealingly arranged on the sensor casing so that the measuring surface carrying the measuring electronics is isolated from the medium. In this manner the disconnecting means can advantageously serve at the same time for disconnecting thermally and/or mechanically induced changes in the sensor casing and as a sealing medium for the isolation of the measuring electronics from the medium to be measured.

In an exemplary embodiment which is particularly important for practical use the disconnecting means is provided in the area of the measuring hole and can simultaneously serve as a seal for sealing the measuring electronics against the medium to be measured so that the surfaces of the sensor which are external with respect to the measuring hole cannot come into contact with the medium to be measured.

It should be understood, however, that it is also possible that the disconnecting means is provided at a radially external circumferential surface of the sensor and also acts as a seal as described above.

Especially preferable the disconnecting means is provided at the sensor zone on the side facing away from the measuring hole, in particular in the area of the electrical feeder, and in a specific variation of an exemplary embodiment of the invention simultaneously seals the measuring electronics against the, for example, aggressive medium.

In another exemplary embodiment the aggressive medium can be supplied to the sensor zone via a measuring sleeve, especially via a measuring sleeve which is sealingly arranged on a perforated membrane. In this manner a seal at the outer surfaces of the sensor can be omitted since the perforated membrane prevents penetration of the medium into the sensor casing as such and the measuring sleeve supplies the medium to be measured at a side of the sensor zone facing away from the measuring surface.

In this regard, both the perforated membrane and the measuring sleeve can be embodied as disconnecting means to perform the function of disconnecting the sensor from thermally and/or mechanically induced changes of the sensor casing.

In practice, the sensor unit will often comprise an attachment means, for example an installation housing having a threaded connection, especially with an M5 thread, or with a snap coupling, e.g. a bayonet coupling, so that the sensor unit can be installed simply and reliably into a device for the measurement of a medium. In a particularly preferred exemplary embodiment, the attachment means itself is embodied as the disconnecting means so that the sensor casing can be disconnected from thermally and/or mechanically induced changes of the installation surroundings. In this case it is even possible that between the sensor itself and the sensor casing no other disconnecting means are to be provided but only sealing means which protect the measuring electronics from a direct influence by the medium.

For mechanical fixation of the sensor, the electrical feeder is particularly preferably embodied as an essentially inflexible pin, otherwise an essentially inflexible passageway for the feeder which in this case can be a flexible electrical lead is provided wherein the passageway may then serve to fix the sensor. That means that the electrical feeder to the sensor is particularly preferably formed as an essentially inflexible pin which is via electrically conductive contacts, also called bumps, and which are for example made of gold or various solders can be connected to the sensor and in this manner not only make an electrical contact to the sensor but also mechanically fix the sensor. The inflexible pin or the inflexible passageway can be disconnected from thermally and/or mechanically induced changes at the sensor casing via a disconnecting means which may be e.g. a more or less resilient plastic or e.g. a resin or resinous substance.

In this respect, the disconnecting means need not necessarily serve simultaneously, as described above for different variations, as a seal for sealing the sensor surface or the measuring electronics, respectively. Furthermore, the disconnecting means need not necessarily be a more or less resilient plastic or a resin or resinous substance.

If for example disconnecting of mechanical distortions such as elongations etc. is the main aim, the disconnecting means can also be achieved by the fact that the materials in contact with each other have the same or very similar thermal expansion coefficients. On the other hand, if disconnecting with respect to heat or temperature transfer is the main aim, the disconnecting means may be e.g. a poor heat conductor such as glass. However, glass will generally disconnect mechanical distortions only very insufficiently. But if for example merely a very reliable measurement of the temperature of the medium is sought which due to the measurement principle is not affected by mechanical distortions in the sensor it is nevertheless possible to use the material glass or other poorly heat conductive materials advantageously as the disconnecting means. It can also be contemplated to provide the disconnecting means by means of a more or less high vacuum between sensor and sensor casing or by any other suitable means known to those skilled in the art as disconnecting means.

If the variable to be measured of the medium is for example a relative variable which can only be regarded in relation to a reference variable the sensor unit according to the invention can also comprise means by which the measuring surface can be subjected to a reference measurable variable.

In exemplary embodiments of a sensor unit according to the invention which are of particular practical importance, the sensor is a pressure sensor, specifically a relative pressure sensor, in particular a and especially relative piezoresistive and/or piezoelectric pressure sensor and/or a piezoelectric and/or piezoresistive temperature sensor.

Those skilled in the art will recognize that all exemplary embodiments described for specific applications can also be suitably combined and the exemplary embodiments presented were discussed representative for other exemplary embodiments of the invention not described in detail here.

Furthermore, the invention relates to a probe having a sensor unit, especially for measuring a gas pressure and/or a temperature in an engine intake of an internal combustion engine and/or in an engine outlet and/or in a combustion chamber and/or in a crankcase and/or in an exhaust system or for measuring a pressure and/or a temperature of a motor oil, a brake fluid, a hydraulic fluid, a gear oil, a coolant, or a cooling fluid, in particular of water.

Moreover, the invention relates to an internal combustion engine, a hydraulic or pneumatic tool or an air conditioner having a sensor unit and/or a probe as detailed above.

SHORT DESCRIPTION OF THE DRAWINGS

Figure 2:
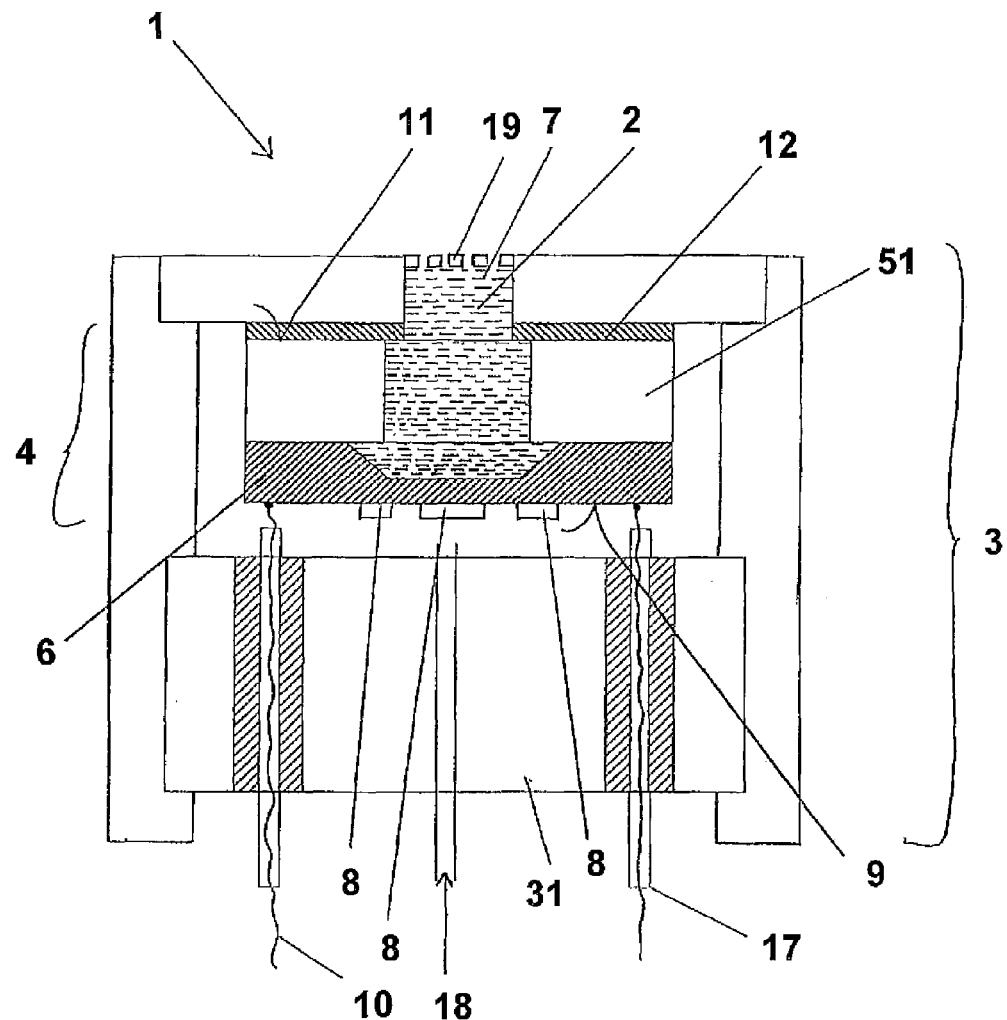
Figure 3:
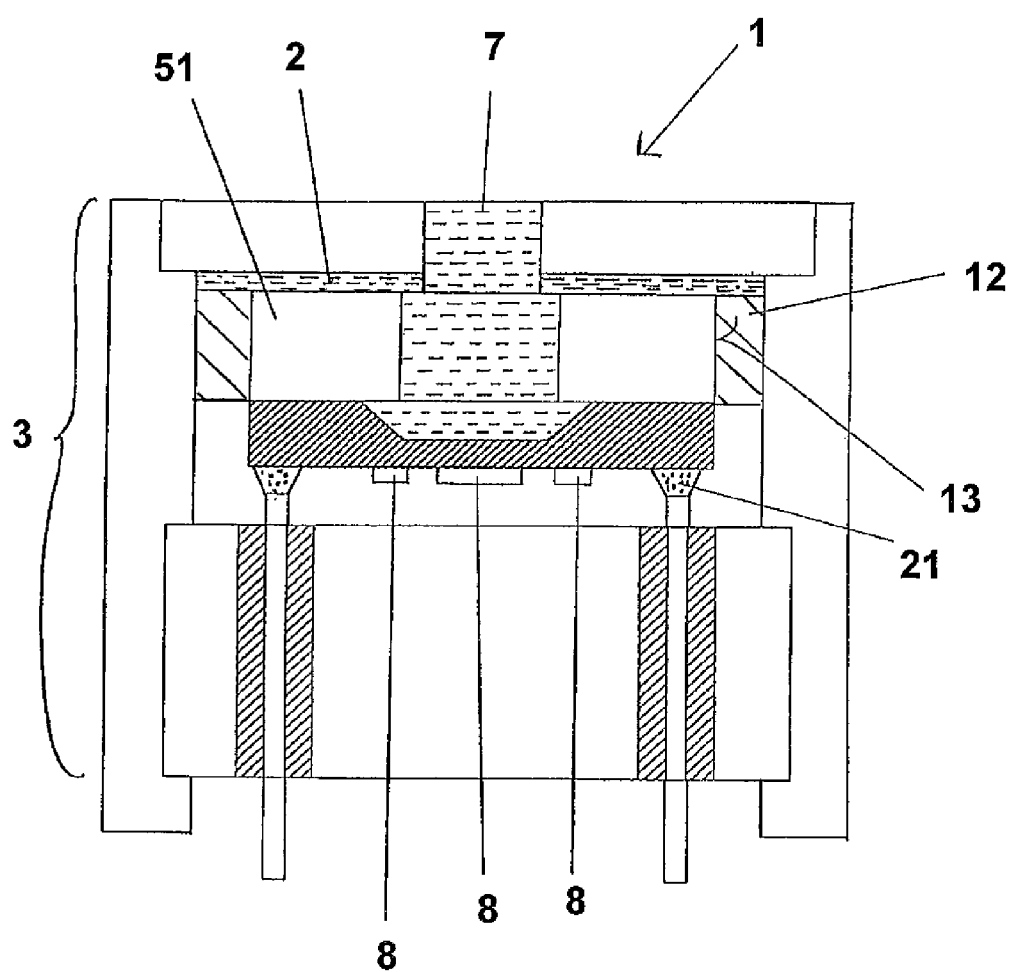
Figure 4:
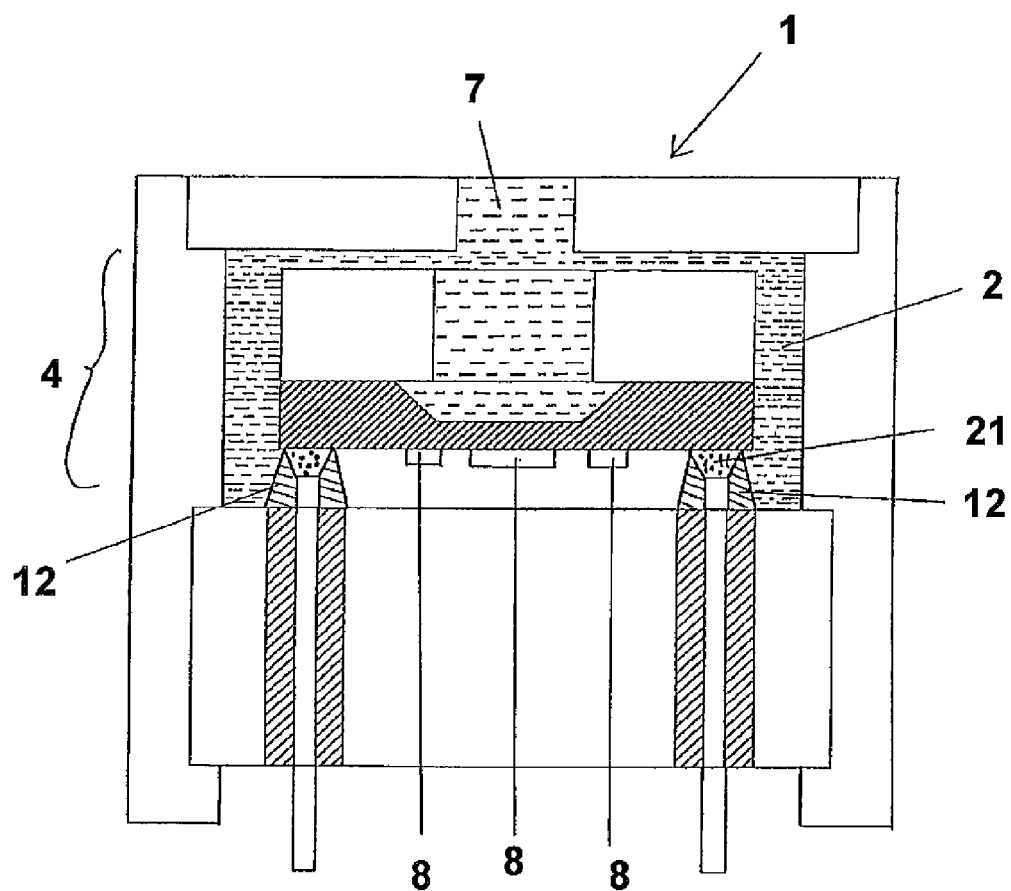
Figure 5:
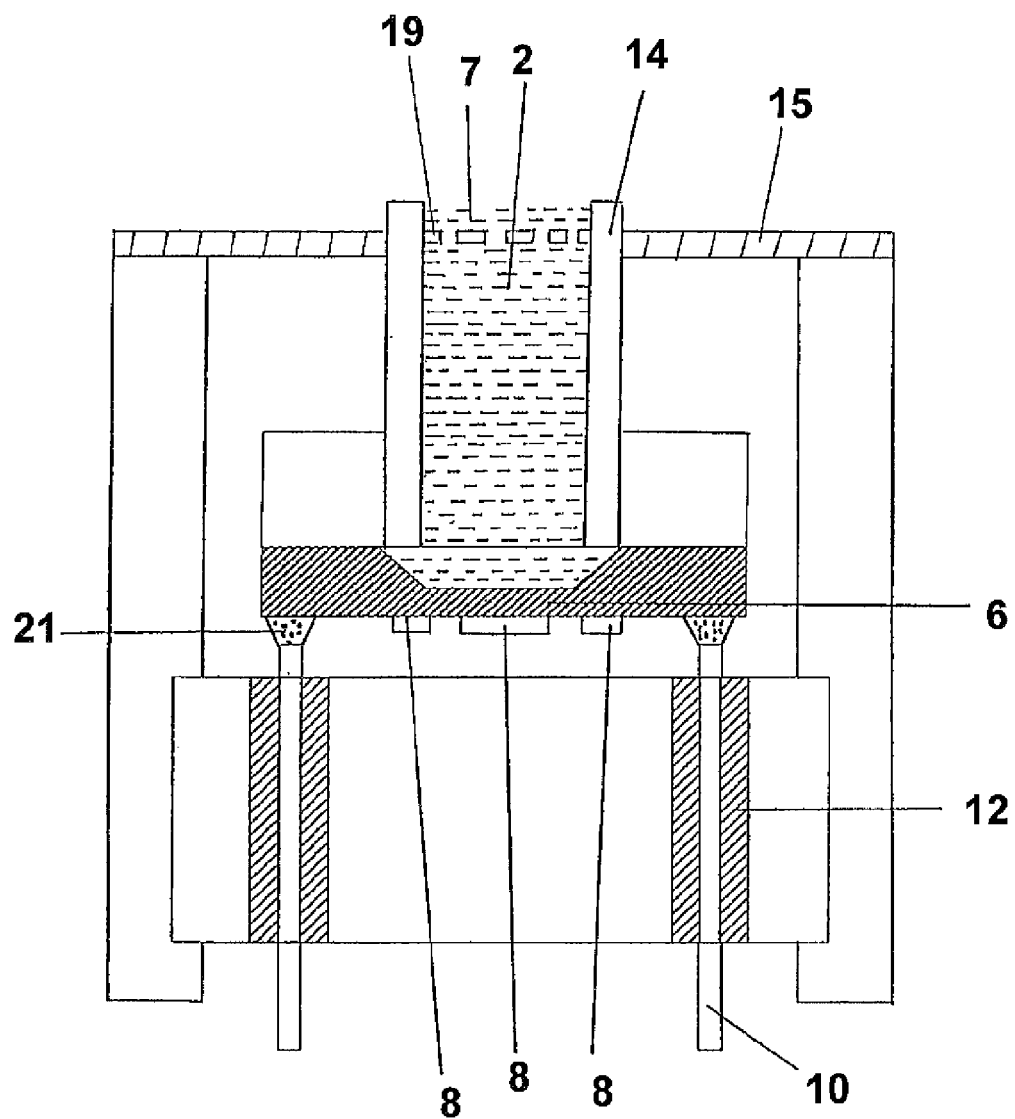
Figure 6:
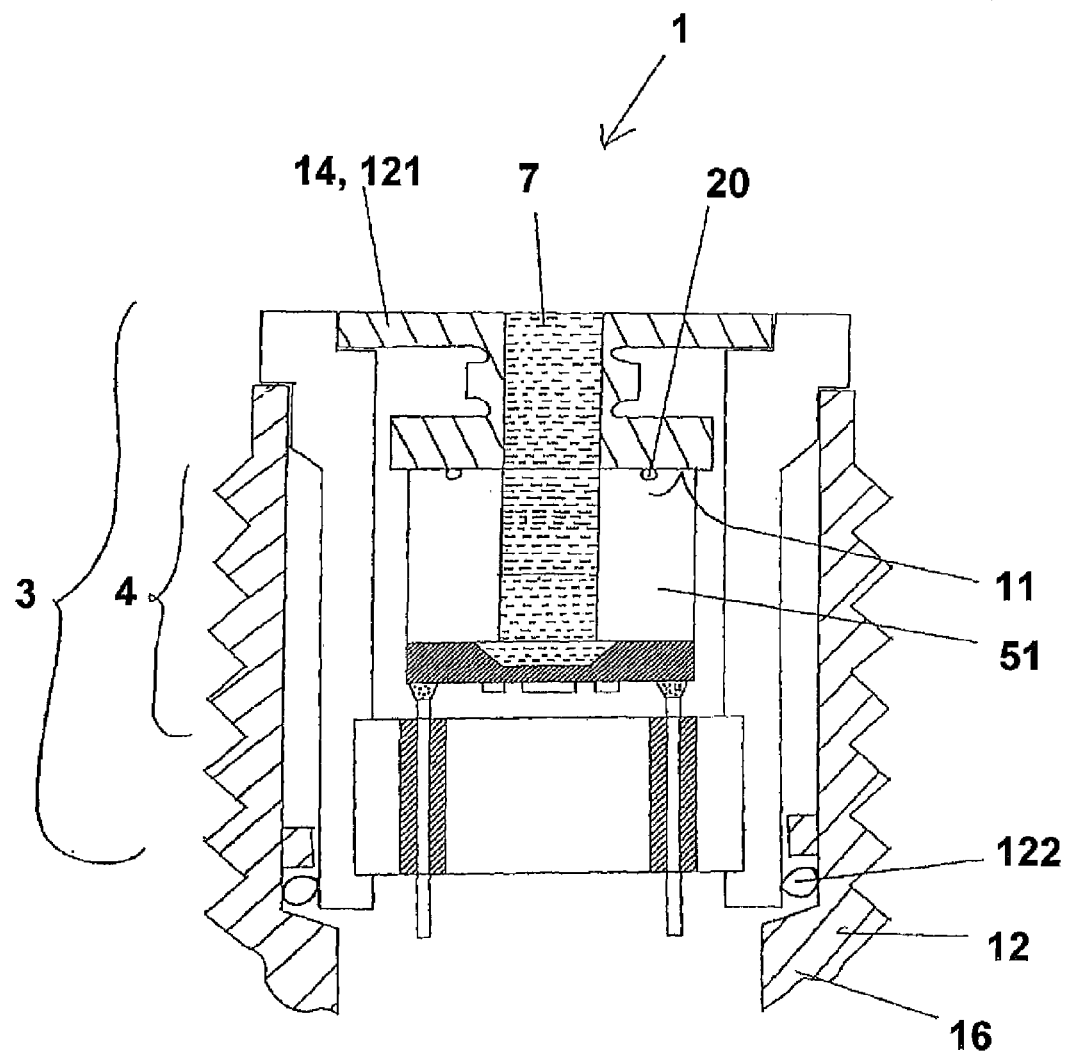

In the following, the invention will be explained in more detail with respect to the drawing. The figures schematically show:

FIG. 1 a first exemplary embodiment of a sensor unit according to the invention;

FIG. 2 a second exemplary embodiment according to FIG. 1 with flexible feeders, protective grating and reference means;

FIG. 3 a third exemplary embodiment;

FIG. 4 a fourth exemplary embodiment;

FIG. 5 an exemplary embodiment with measuring sleeve, perforated membrane, and protective grating;

FIG. 6 an exemplary embodiment having a measuring sleeve as the disconnecting means.

WAYS OF EMBODYING THE INVENTION

FIG. 1 shows a schematic representation of a first exemplary embodiment of the sensor unit according to the invention which in the following as a whole will be designated by the reference numeral 1.

The sensor unit 1 which is particularly suitable for measuring a measurable variable in an aggressive medium 2 comprises a sensor casing 3 in which a sensor 4 is disposed for the detection of a measurable variable in an aggressive medium 2. The sensor unit 1 can be e.g. a combined pressure/temperature sensor for measuring the oil pressure and/or the temperature of the motor oil in an internal combustion engine. The sensor 4 comprises a support 51, in the present case a support 51 made of glass, attached to the base 5 which in the exemplary embodiment in FIG. 1 is made of silicon and/or a silicon compound such as SOI (silicon on insulator) and/or SiC and/or another suitable silicon compound. A measuring hole 7 in the sensor casing 3 ensures that the medium 2 can enter into the sensor unit 1. The base 5 has a sensor zone 6 sensitive for the measurable variable on which the medium 2 acts directly. On a side of the sensor zone 6 facing away from the measuring hole 7 there is provided a measuring electronics 8 on a measuring surface 9 at which an electrical feeder 10 is provided for transmission of a sensor signal generated by the measuring electronics 8 to an evaluation device not represented in FIG. 1. The electrical feeder 10 is embodied in the form of an essentially inflexible pin 10 which can be for example a more or less rigid pin 10 made of copper or gold or another suitable material and which not only contacts the sensor 4 electrically in order to transmit the sensor signals from the measuring electronics but also mechanically fixes the sensor 4 on a support plate 31 of the sensor casing 3. The connection between the rigid pin 10 and the measuring surface 9 is preferably made by a so-called bump consisting of gold, a suitable solder, or another suitable material. To disconnect the sensor 4 from thermally and/or mechanically induced changes of the sensor casing 3 the pins 10 are embedded in a disconnecting means 12, here e.g. a glass or a more or less resilient plastic or a resin. The use of essentially inflexible pins 10 in the form of pins 10 is of particular advantage if the sensor unit 1 is subjected to high mechanical loads, e.g. the vibrations of an internal combustion engine, leading to the risk that e.g. thin wires 10 serving as the feeders 10 could be broken or torn.

In addition to the disconnecting means 12 at the electrical feeders 10, between the glass support 51 at a sealing surface 11 is provided a disconnecting means 12 which is formed as a seal which can be e.g. a plastic, a rubber-like substance such as a gel or a resinous substance so that the support 51 is disconnected from thermally and/or mechanically induced changes in the sensor casing 3 and at the same time the aggressive medium 2 is isolated from the measuring surface 9 and the measuring electronics 8, respectively. In this way measurements can be performed with the sensor unit of FIG. 1 and naturally also with all other sensor units 1 according to the invention also in very aggressive media 2 such as hot and/or chemically or physically aggressive media 2 such as liquids or gases without affecting the measuring electronics 8.

In FIG. 2 is shown a second exemplary embodiment according to FIG. 1 having flexible feeders 10 and a reference means 18. In this exemplary embodiment the sensor 4 is mechanically fixed to the sensor casing 3 at the sealing surface 11 only via the support 51 and a disconnecting means 12 formed as a seal. Here, the electrical feeders 10 are embodied as flexible electrical wires 10 and are led to the measuring surface 9 via passageways 17 through the support plate 31. The use of thin flexible electrical wires 10 as the feeder 10 can be particularly advantageous if e.g. the supply or discharge of heat via the feeders 10 must be minimized and the sensor unit is not subjected to particularly high loads so that there is no risk of breaking or tearing of the wires. In the exemplary embodiment in FIG. 2 a protective grating 19 is additionally provided at the measuring hole 7 which e.g. prevents dirt particles from entering so that the sensor zone is not damaged.

A reference variable can be supplied to the measuring surface 9 or the measuring electronics, respectively, via the reference means 18 so that a reference measurement can be conducted with the sensor unit 1. If the sensor is e.g. a pressure sensor the reference means 18 may be a pressure line through which the measuring surface 9 can be subjected to a predetermined reference pressure so that a pressure difference between the medium 2 and the reference pressure can be directly determined with the sensor 4.

FIGS. 3 and 4 show third and fourth exemplary embodiments of the present invention. These two examples differ from the preferred exemplary embodiment shown in FIG. 1 only in that the disconnecting means 12 which in these cases also have simultaneously the function of a seal for the measuring electronics 8 against the aggressive medium 2 are not provided in the area of the measuring hole 7 but between a radially outward facing circumferential surface 13 of the sensor 4 and the sensor casing 3 in FIG. 3 while in the example of FIG. 4 the disconnecting means 12 are provided at the base 5 on the side facing away from the measuring hole 7 in the area of the electrical feeder 10. An arrangement according to FIG. 4 can be particularly advantageous if e.g. a uniform temperature control of the sensor 4 is needed. It should be understood that the sealing measures shown in FIGS. 3 and 4 can also suitably combined.

FIG. 5 schematically shows another exemplary embodiment of a sensor unit 1 of the invention having a measuring sleeve 14 and a perforated membrane 15. In this variation the aggressive medium 2 is supplied to the sensor zone 6 via a measuring sleeve which in the present example is sealingly arranged at an opening of the perforated membrane 15. In order to prevent e.g. dirt particles present in the medium 2 from coming into contact with the sensor zone 6 a protective grating 19 is provided at the measuring hole 7 similar to FIG. 2 which may for example be a mesh network 19 made of steel or plastic or another material. Because the measuring sleeve 14 passes sealingly through the opening of the perforated membrane 15 and the perforated membrane 15 is also attached sealingly to the sensor casing 3, for example adhered to the sensor casing 3 by a suitable adhesive, the aggressive fluid 2 can enter into the interior of the sensor casing 3 via the measuring sleeve 14 and thus can only be supplied from that side of the sensor zone 6 which faces away from the measuring electronics 8.

The sensor 4 can be disconnected from thermally and/or mechanically induced changes of the sensor casing 3 by embedding the electrical feeders 10 in disconnecting means 12 analogously to FIG. 1, as schematically shown in FIG. 5. Additionally or alternatively also the perforated membrane 15 may serve as disconnecting means 12 by constructing the perforated membrane 15 e.g. from a more or less elastic or flexible material which compensates e.g. mechanical tensions.

Finally, FIG. 6 represents an exemplary embodiment in which the measuring sleeve 14 itself is employed as disconnecting means 12 and a perforated membrane 15 is omitted. In this exemplary embodiment the measuring sleeve 14 is embodied as a disconnecting body 121 sealingly attached at the sealing surface 11 of the support 51, in this case via a glass weld 20, to the sensor 4 and on the other hand sealingly connected to the sensor casing 3 in such a way that the aggressive medium 2 can enter the interior of the sensor unit 1 only through the measuring hole 7. The measuring sleeve 14 embodied as disconnecting body 121 is formed in a way and of a material, e.g. made from a suitable plastic or metal or another suitable material, that it disconnects the sensor 4 from thermally and/or mechanically induced changes of the sensor casing 3. By embodying the measuring sleeve 14 itself as disconnecting means 12 the connection between the sensor 4 and the measuring sleeve 14 can also be achieved by a more or less rigid link, as in the present case via a glass weld 20.

The sensor unit 1 according to FIG. 6 additionally comprises an attachment means 16 und thus forms a probe which in the present case has an M5 threaded connection 16 for installation in an internal combustion engine. The threaded connection 16 in FIG. 6 is embodied as an additional disconnecting means which, although it is advantageous, is not necessarily required. In this way is achieved, however, that in the lower region of the probe according to the Figure disconnecting pieces 122 are provided between the threaded connection 16 and the sensor casing 3 which are able to compensate mechanical tensions generated for example during screwing the probe into an internal combustion engine but also other thermally and/or mechanically induced changes which thereby are not transmitted onto the sensor unit.

Thus, the present invention provides for the first time a sensor unit and a probe by which measurable variables such as for example pressure or temperature can be determined even in an aggressive medium with high reliability and accuracy but without interfering influences due to thermally and/or mechanically induced changes from the installation surroundings which influence the measurement. Thus, for the first time there is provided a sensor which is disconnected from interfering influences of the surroundings which can be employed not only but above all in aggressive media such as e.g. in an aggressive oil or in hot aggressive combustion gases of an internal combustion engine and wherein measurement signals can be detected with the highest precision and accuracy and with an heretofore unequalled signal-to-noise ratio.

LIST OF REFERENCE NUMERALS 1 sensor unit
2 medium
3 sensor casing
4 sensor
5 base
6 sensor zone
7 measuring hole
8 measuring electronics
9 measuring surface
10 electrical feeder
11 sealing surface
12 disconnecting means
13 circumferential surface
14 measuring sleeve
15 perforated membrane
16 attachment means
17 passageway
18 reference means
19 protective grating
20 glass weld
21 bump
31 support plate
51 support
121 disconnecting body
122 disconnecting pieces

The invention claimed is:

1. A sensor unit for measuring a measurable variable, especially in an aggressive medium (2) comprising a sensor (4) which is disposed in a sensor casing (3) and provided with a sensor zone (6) located on a base (5) wherein for the detection of the measurable variable in the sensor zone (6) a measuring hole (7) is provided in the sensor casing (3) which allows the medium (2) to advance directly to the sensor zone (6), and a side of the sensor zone (6) that faces away from the measuring hole (7) is equipped with a measuring surface (9) which encompasses measuring electronics (8) wherein for the transmission of a sensor signal generated by the measuring electronics (8) an electrical feeder (10) is provided on the sensor (4), and the sensor (4) is sealingly arranged on a sealing surface (11) located on the sensor casing (3) so that the measuring surface (9) is isolated from the aggressive medium (2) characterized in that a disconnecting means (12) is provided by means of which the sensor (4) can be disconnected from thermally and/or mechanically induced changes of the sensor casing (3).

2. A sensor unit according to claim 1 wherein the disconnecting means (12) is provided in the area of the measuring hole (7).

3. A sensor unit according to claim 1 wherein the disconnecting means (12) is provided at a radially outward facing circumferential surface (13) of the sensor (4).

4. A sensor unit according to claim 1 wherein the disconnecting means (12) is provided on the base (5) on the side facing away from the measuring hole (7), in particular in the area of the electrical feeder (10).

5. A sensor unit according to claim 1 wherein the aggressive medium (2) can be supplied to the sensor zone (6) via a measuring sleeve (14), especially via a measuring sleeve (14) sealingly arranged on a perforated membrane (15).

6. A sensor unit according to claim 5 wherein the perforated membrane (15) is formed as a disconnecting means (12).

7. A sensor unit according to claim 5 wherein the measuring sleeve (14) is formed as a disconnecting means (12).

8. A sensor unit according to claim 1 wherein the sensor unit comprises an attachment means (16), particularly an attachment means (16) formed as a disconnecting means (12).

9. A sensor unit according to claim 1 wherein for mechanical fixation of the sensor (4) the electrical feeder (10) is formed as an essentially inflexible pin (10), and/or an essentially inflexible passageway (17) for the feeder (10) is provided.

10. A sensor unit according to claim 1 wherein reference means (18) are provided so that the measuring surface (9) can be subjected to a reference measurable variable.

11. A sensor unit according to claim 1 wherein the sensor (4) is a pressure sensor, particularly a piezoresistive pressure sensor and/or a piezoelectric pressure sensor and/or a piezoresistive temperature sensor and/or a piezoelectric temperature sensor.

12. A probe with a sensor unit (1) for measuring a measurable variable, especially in an aggressive medium (2) comprising a sensor (4) which is disposed in a sensor casing (3) and provided with a sensor zone (6) located on a base (5) wherein for the detection of the measurable variable in the sensor zone (6) a measuring hole (7) is provided in the sensor casing (3) which allows the medium (2) to advance directly to the sensor zone (6), and a side of the sensor zone (6) that faces away from the measuring hole (7) is equipped with a measuring surface (9) which encompasses measuring electronics (8) wherein for the transmission of a sensor signal generated by the measuring electronics (8) an electrical feeder (10) is provided on the sensor (4), and the sensor (4) is sealingly arranged on a sealing surface (11) located on the sensor casing (3) so that the measuring surface (9) is isolated from the aggressive medium (2), whereas a disconnecting means (12) is provided by means of which the sensor (4) can be disconnected from thermally and/or mechanically induced changes of the sensor casing (3), whereas the probe is especially for measuring a gas pressure and/or a temperature in an engine intake of an internal combustion engine and/or in an engine outlet and/or in a combustion chamber and/or in a crankcase and/or in an exhaust system, or for measuring a pressure and/or temperature of a motor oil, a brake fluid, a hydraulic oil, a gear oil, a coolant, or a cooling fluid, particularly water.

13. A probe according to claim 12 wherein the disconnecting means (12) is provided in the area of the measuring hole (7).

14. A probe according to claim 12 wherein the disconnecting means (12) is provided at a radially outward facing circumferential surface (13) of the sensor (4).

15. A probe according to claim 12 wherein the disconnecting means (12) is provided on the base (5) on the side facing away from the measuring hole (7), in particular in the area of the electrical feeder (10).

16. A probe according to claim 12 wherein the aggressive medium (2) can be supplied to the sensor zone (6) via a measuring sleeve (14), especially via a measuring sleeve (14) sealingly arranged on a perforated membrane (15).

17. A probe according to claim 16 wherein the perforated membrane (15) is formed as a disconnecting means (12).

18. A probe according to claim 16 wherein the measuring sleeve (14) is formed as a disconnecting means (12).

19. A probe according to claim 12 wherein the sensor unit comprises an attachment means (16), particularly an attachment means (16) formed as a disconnecting means (12).

20. A probe according to claim 12 wherein for mechanical fixation of the sensor (4) the electrical feeder (10) is formed as an essentially inflexible pin (10), and/or an essentially inflexible passageway (17) for the feeder (10) is provided.

* * * * *